Nov. 17, 1964  W. H. KIMBERLY, JR  3,157,807
SPEED CONTROL FOR MAGNETIC CLUTCH
Filed May 22, 1962  2 Sheets-Sheet 1

INVENTOR.
WILMER H. KIMBERLY, JR.
BY
Agent

INVENTOR.
WILMER H. KIMBERLY, JR.
BY
George C Sullivan
Agent

United States Patent Office 3,157,807
Patented Nov. 17, 1964

3,157,807
SPEED CONTROL FOR MAGNETIC CLUTCH
Wilmer H. Kimberly, Jr., Atlanta, Ga., assignor to Lockheed Aircraft Corporation, Burbank, Calif.
Filed May 22, 1962, Ser. No. 196,786
3 Claims. (Cl. 310—95)

This invention relates to a speed control, and more particularly to a fast response speed control for controlling the energization of the control winding of a magnetic eddy current clutch.

The speed control comprises fast responsive transistors which discriminately control a controlled rectifier in accordance with the speed of a magnetic clutch output shaft to accurately vary the energization of the clutch control winding in accordance with a desired speed setting. Being continuously operative in response to a control signal indicative of the speed of the clutch output shaft, the speed control prevents transient loading conditions from rendering the speed control ineffective. The speed control has the important attribute of providing maximum clutch control winding energization upon starting, thus permitting maximum torque to be developed between the driving and driven means interconnected by the clutch until a selected operational speed is achieved. At this time the clutch control winding energization is reduced until it becomes stabilized at the selected speed setting of the control.

It is therefore an object of this invention to provide a compact, reliable and precision speed control.

It is another object of this invention to provide a transistorized speed control including a magnetic eddy current clutch wherein maximum clutch energization and coupling is provided upon starting.

A further object of this invention is to provide a transistorized control for varying the energization of the control winding of a magnetic clutch in accordance with the speed of an output shaft connected thereto.

Still a further object of this invention is to provide a magnetic clutch interconnecting a driving means and driven means, a transistorized speed control for applying an energization voltage to the control winding of the clutch, and a tachometer generator sensing the speed of the driven means and applying a continuously operative control signal to the speed control in accordance with the sensed speed for controlling the clutch energization voltage in accordance with a predetermined speed setting.

Figure 1:
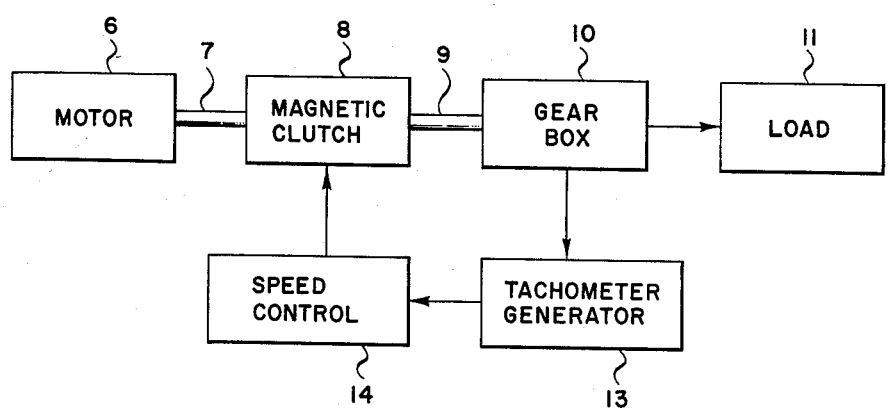
Figure 2:
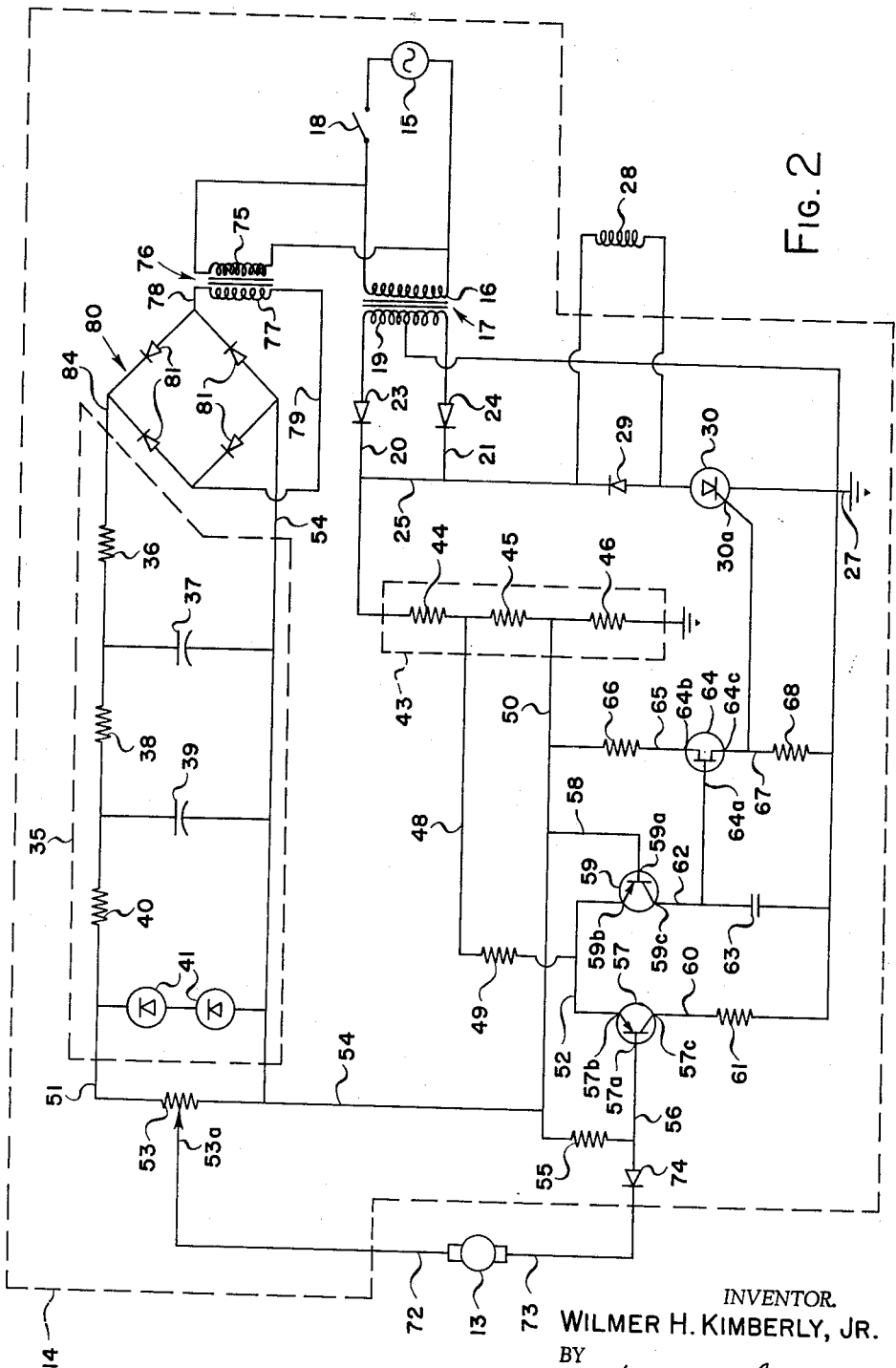

Other objects and advantages will become apparent from the following description taken in connection with the accompanying drawings in which:

FIGURE 1 is a block diagram of a typical implementation of the speed control of this invention; and FIGURE 2 is a schematic wiring diagram of the speed control of this invention.

Generally stated, a preferred embodiment of this invention comprises a transistorized speed control for controlling the energization of the control winding of a magnetic clutch interconnecting a driving means and a driven means in accordance with the speed of the driven means.

More specifically, there is shown in block diagram in FIGURE 1 a driving means or motor 6 connected by input shaft 7 to magnetic eddy current clutch 8 which, in turn, is connected by output shaft 9 through gear box 10 to a driven means or load 11. Gear box 10 is additionally connected to tachometer generator 13 which is connected to control 14 for controlling the energization of magnetic clutch 8 in accordance with the speed of the output shaft and the load.

Referring now to FIGURE 2 there is shown a control 14 comprising a source of A.C. current 15 which is connected to the primary 16 of center tap transformer 17 and to the primary 75 of transformer 76. An on-off switch 18 is provided for controlling the energization of the transformers 17 and 76. Secondary 19 of transformer 17 is connected by leads 20 and 21 having diodes or rectifiers 23 and 24 therein, respectively, to supply a single phase, full wave rectified voltage to lead 25 and to voltage divider 43 comprising series connected resistors 44, 45 and 46. Lead 25 is connected through the field or control winding 28 of clutch 8, having diode 29 in parallel circuit therewith, through the anode-cathode circuit of preferably solid state Silicon Controlled Rectifier (SCR) 30 to ground 27. The single phase, full wave rectified voltage supplied by transformer 17 to lead 25 serves as a reference voltage for the SCR 30.

Secondary 77 of transformer 76 is connected by leads 78 and 79 to a full wave rectifier 80 comprising bridge-connected diodes 81 which in turn are connected to the ripple filter 35 by leads 84 and 54. Ripple filter 35 comprises a resistor 36 connected to lead 84 at one end and connected at the other end through capacitor 37 to lead 54. Resistor 36 is also connected to resistor 38 which is connected through capacitor 39 to lead 54 and is additionally connected to resistor 40. Resistor 40 is connected through clipping Zener diodes 41 to lead 54 and by lead 51 to selectively variably adjustable resistor or potentiometer 53.

Potentiometer 53 is also connected by lead 54 to resistor 55 which is connected by lead 56 to the base 57a of the transistor 57. Potentiometer 53 is additionally connected by lead 54 and lead 58 to the base 59a of transistor 59. A lead 48 having a resistor 49 therein is connected between resistors 44 and 45 of voltage divider 43 at one end and at the other end through lead 52 to the emitters 57b and 59b of transistors 57 and 59, respectively. Collector 57c of transistor 57 is connected by lead 60 having resistor 61 therein to ground 27, and the collector 59c of transistor 59 is connected by lead 62 to the capacitor 63 which in turn is connected to ground 27, and is additionally connected to the emitter 64a of unijunction transistor 64. The second base 64b of the unijunction transistor 64 is connected by lead 65 having resistor 66 therein to lead 50 which is connected between resistors 45 and 46 of voltage divider 43. The first base 64c of the unijunction transistor is connected by lead 67 having resistor 68 therein to ground, and is additionally connected to the gate 30a of SCR 30. As the second base 64b of unijunction transistor 64 is connected to the voltage divider 43, which in turn is connected to the reference voltage supply for the SCR 30, the operation of the unijunction transistor 64 is timed with respect to the operation of the SCR 30. Further, the voltage of lead 51 is greater than the voltage of lead 52 which in turn is greater than the voltage of lead 58 for a purpose which will presently more clearly appear. To complete the circuit of control 14, the tachometer generator 13, a D.C. tachometer generator producing a control signal voltage which varies linearly in relation to the sensed rotational speed of output shaft 9, is connected by lead 72 to the adjustable element 53a of potentiometer 53 and by lead 73 having diode 74 therein to lead 56 to supply a negative D.C. control signal voltage to the base 57a of transistor 57 in opposition to the positive D.C. voltage being applied thereto from lead 51.

In operation, when the switch 18 is closed, the voltage source 15 applies an A.C. voltage to the primaries of transformers 17 and 76. Secondary 19 of transformer 17 applies a signal to rectifiers 23 and 24 which is single phase, full wave rectified by the rectifiers and is applied as a positive unidirectional cyclically varying reference voltage to the anode-cathode circuit of SCR 30 and the voltage divider network 43. Also, the secondary 77 of transformer 76 applies full wave rectified positive D.C. voltage pulses through rectifier 80 to the ripple filter 35 which filters and smooths out the pulses. Diodes 41 clip the filtered D.C. voltage, and consequently a regulated D.C. voltage of constant magnitude is applied to potentiometer 53 through lead 51.

At the time immediately after switch 18 is closed, transistor 57 is not conducting because the voltage being applied to its base 57a from lead 51 is more positive than the voltage being applied to its emitter 57b by lead 52 from lead 48, and the transistor 59 is conducting because the voltage being applied to its base 59a by lead 58 from lead 50 is more negative than the voltage being applied to its emitter 59b from lead 52. Voltage is therefore built up on capacitor 63 until the voltage thereon is sufficient to discharge the unijunction transistor 64. The unijunction transistor 64, in turn, applies a gating pulse to the gate 30a of SCR 30 to bias the SCR to conduction during each cycle of its reference voltage. At this time the transistor 59 is conducting at a maximum; therefore, the equivalent resistance-capacitance time constant of transistor 59 and capacitor 63 is at a minimum. Thus, the frequency of conduction of the unijunction transistor 64 is maximum and the SCR 30 is pulsed during substantially each entire cycle of the SCR reference supply voltage. Upon conduction of the SCR 30, a current path is provided from lead 25 through clutch control coil 28 and the SCR 30 to ground 27 to provide an energization current in the coil during the time the SCR is conducting. Since the SCR 30 is pulsed during substantially each cycle of reference voltage, the coil 28 is energized to maximum, and maximum clutch coupling is developed between the motor 6 and the load 11.

As the output shaft 9 connecting the clutch 8 to load 11 picks up speed, the tachometer generator 13 produces a control voltage signal across leads 72 and 73 in opposition to the voltage being applied to the base 57a of transistor 57 from lead 51, such that when the load is being driven at the desired speed, the voltage being applied to the base 57a of transistor 57 will become negative with respect to the emitter 57b thereof causing transistor 57 to begin conduction. As the conduction of transistor 57 increases, the resistance of its emitter-collector junction decreases in an amount determined by the magnitude of the voltage signal being applied to its base with respect to the voltage signal being applied to its emitter. When the transistor 57 is conducting, current is permitted to flow from lead 52 through the emitter-collector junction of transistor 57 and through resistor 61 to ground 27, thereby decreasing the voltage of lead 52 and the voltage of the emitters of transistors 57 and 59 with respect to ground and with respect to the bases of transistors 57 and 59. Since the emitter of transistor 57 is becoming more negative with respect to its base, the transistor 57 tends to increase conduction. At the same time, the emitter 59b of transistor 59 is becoming less positive with respect to its base 59a and the transistor 59 tends to decrease conduction. Transistor 59 decreases conduction until the resistance of its emitter-collector junction is increased to a value necessary to stabilize the voltage in lead 52, at which time a further increase in the conduction of transistor 57 is prevented. In this manner the conduction of transistors 57 and 59, and consequently the duration and amplitude of pulses being applied to the unijunction transistor 64, is accurately controlled. Accordingly, the time in each cycle of reference supply voltage during which the SCR 30 receives a timed gating pulse from the unijunction transistor 64, is decreased to decrease the energization voltage being supplied to the control winding 28 to prevent a further increase in the speed at which a load 11 is driven. It will be appreciated from the foregoing that when the voltage signal being applied to the base of transistor 57 varies, as when a transient clutch-loading condition occurs, the frequency of pulses being applied to the unijunction transistor, the time in the cycle of its reference voltage supply the SCR 30 receives a gating pulse, and the amount of energization of the control winding 28 will be quickly, precisely, discriminately and automatically varied as a function of the voltage signal, in the manner above described, to maintain the speed of the driven shaft constant. It will further be appreciated that the setting of potentiometer 53 determines the amount of energization voltage supplied to the control winding 28 of clutch 8.

While a particular embodiment of the invention has been illustrated and described, it will be obvious to those skilled in the art that various changes and modifications may be made without departing from the invention and it is intended to cover in the appended claims all such modifications and equivalents as fall within the true spirit and scope of this invention.

What is claimed is:

1. A speed control for controlling the level of energization of the control winding of a magnetic clutch interconnecting a driving means and a driven means comprising: a controlled rectifier having a gate and an anode-cathode circuit, said anode-cathode circuit connected to said control winding and to a source of positive unidirectional cyclically varying reference voltage; a unijunction transistor for apply a gating pulse to the gate of said controlled rectifier during each cycle of said reference voltage; a storage capacitor for charging said unijunction transistor to firing level; first transistor means for charging said capacitor to the unijunction transistor firing level; means sensing the speed of said driven means and producing a control signal representative thereof; and second transistor means connected to said first transistor means and responsive to said control signal to vary the time in each cycle of said reference voltage said first transistor means charges said capacitor to the unijunction transistor firing level to vary the energization of said clutch control winding in accordance with said control signal.

2. A driving means and a driven means interconnected by a magnetic clutch having a control winding the level of energization of which determines the speed of said driven means; a speed control for said driven means operative to control the level of energization of said clutch control winding comprising: a controlled rectifier having a gate and an anode-cathode circuit, said anode-cathode circuit connected to said control winding and to a source of cyclically varying unidirectional reference voltage; a unijunction transistor referenced with respect to said reference voltage for applying a gating pulse to the gate of said controlled rectifier; a storage capacitor for charging said injunction transistor to firing level; a first transistor for charging said capacitor to the unijunction transistor firing level; a tachometer generator for sensing the speed of said driven means operative to produce a control signal representative of the sensed speed; and a second transistor operatively connected to said first transistor and to said control signal to vary the time in each cycle of said reference voltage said first transistor charges said capacitor to the unijunction transistor firing level to vary the energization of said clutch control winding in accordance with said control signal.

3. A speed control for a magnetic clutch having a control winding controlling the speed of a load in accordance with the level of energization of the clutch control winding comprising: a source of cyclically varying unidirectional positive reference voltage; a Silicon Controlled Rectifier having an anode, a cathode, and a gate, said control winding being connected at one end to said reference voltage and at the other end through the anode-cathode circuit of said rectifier to ground; a unijunction transistor having an emitter, a first base, and a second base, said second base being connected to said reference voltage and said first base being connected to ground and to said gate; a storage capacitor connected at one side to the emitter of said unijunction transistor and at the other side to ground; a first normally conducting PNP transistor having a base, emitter, and collector, said base being connected to a source of positive voltage, said emitter being connected to a source of positive voltage of higher potential than the voltage supplied to said base, and said collector being connected to said one end of said storage capacitor; a second normally non-conducting PNP transistor having a base, emitter, and collector, said emitter being connected to the same voltage source as the emitter of said first transistor, said collector being connected through a resistor to ground, and said base being connected to a source of positive regulated voltage of higher potential than the voltage being supplied to said emitters; and tachometer generator means connected to sense the speed of said load and apply a negative D.C. voltage representative of the sensed speed in opposition to said regulated voltage, said negative voltage being operative upon the attainment of a predetermined level to bias said second transistor to conduction and consequently decrease conduction of said first transistor to control the time in each cycle of reference voltage supply said rectifier receives a gating pulse from said unijunction transistor to control the level of energization of said control winding.

References Cited in the file of this patent

UNITED STATES PATENTS 3,061,747     Schlicher _____ Oct. 30, 1962

FOREIGN PATENTS 1,245,930     France _____ Oct. 3, 1960